United States Patent [19]

Pandey et al.

[11] Patent Number: 5,612,010
[45] Date of Patent: Mar. 18, 1997

[54] SELECTIVE CATALYTIC REDUCTION OF NITROGEN OXIDES

[75] Inventors: Raj N. Pandey, 34 Old Colony Trail, Guelph, Ontario, Canada, N1G 4A9; Kebir Ratnani, Boucherville, Canada; Raghunandan L. Varma, Guelph, Canada; David Elkaim, St.-Laurent, Canada; Rupesh N. Pandey, Guelph, Canada

[73] Assignees: Gas Metropolitain & Company, Limited, Montreal; Raj N. Pandey, Guelph, both of Canada

[21] Appl. No.: 380,401

[22] Filed: Jan. 30, 1995

[51] Int. Cl.$^6$ ........................................ B01J 8/00
[52] U.S. Cl. ............................................. 423/239.1
[58] Field of Search ................................ 423/239.1

[56] References Cited

U.S. PATENT DOCUMENTS

| | | | |
|---|---|---|---|
| 3,702,886 | 11/1972 | Argauer et al. | 423/705 |
| 4,946,659 | 8/1990 | Held et al. | 423/212 |
| 5,057,293 | 10/1991 | Epperly et al. | 423/235 |
| 5,085,840 | 2/1992 | Held et al. | 423/212 |
| 5,139,754 | 8/1992 | Luftglass et al. | 423/235 |
| 5,149,511 | 9/1992 | Montreuil et al. | 423/212 |
| 5,279,997 | 1/1994 | Montreuil et al. | 423/213.2 |
| 5,354,544 | 10/1994 | Logan et al. | 423/213.7 |

FOREIGN PATENT DOCUMENTS

| | | |
|---|---|---|
| 991824 | 6/1976 | Canada . |
| 998824 | 10/1976 | Canada . |
| 1034741 | 7/1978 | Canada . |
| 1062442 | 9/1979 | Canada . |
| 1083327 | 8/1980 | Canada . |
| 1255475 | 6/1989 | Canada . |
| 2010585 | 8/1990 | Canada . |
| 2127538 | 8/1990 | Canada . |
| 2013100 | 9/1990 | Canada . |
| 2013869 | 6/1991 | Canada . |
| 2048472 | 2/1992 | Canada . |
| 2072604 | 3/1992 | Canada . |
| 2054321 | 5/1992 | Canada . |
| 1306341 | 8/1992 | Canada . |
| 2060229 | 8/1992 | Canada . |
| 2040045 | 10/1992 | Canada . |
| 2074687 | 2/1993 | Canada . |
| 2079176 | 4/1993 | Canada . |
| 1324876 | 12/1993 | Canada . |
| 2141564 | 2/1994 | Canada . |
| 2112634 | 7/1994 | Canada . |
| 1334476 | 2/1995 | Canada . |
| 2131751 | 3/1995 | Canada . |
| 1336355 | 7/1995 | Canada . |
| 0286967 | 4/1988 | European Pat. Off. . |
| 0364694 | 8/1989 | European Pat. Off. . |

(List continued on next page.)

OTHER PUBLICATIONS

H. Bosch and F. Janssen, Catalysis Today, vol. 2, 1987, pp. 369–519. (no month).
F. P. Boer et al., CHEMTECH, May 1990, pp. 312–319.
J. W. Beeckman and L. L. Hegedus, Ind. Eng. Chem. Res., vol. 30, 1991, pp. 969–978 (no month).
J. W. Byrne et al., Catalysis Today, vol. 13, 1992, pp. 33–41 (no month).
J. Marangozis, Ind. Eng. Chem. Res., vol. 31, No. 4, 1992, pp. 987–994. (no month).

*Primary Examiner*—Steven Bos
*Assistant Examiner*—Thomas G. Dunn, Jr.
*Attorney, Agent, or Firm*—Foley & Lardner

[57] ABSTRACT

The selective catalytic reduction of nitrogen oxides to nitrogen is effected by reacting nitric oxide, nitrogen dioxide or a mixture thereof with a reducing agent consisting of an aliphatic carboxylic acid having 1 to 5 carbon atoms at a temperature ranging from about 250° to about 600° C., in the presence of a catalyst comprising a metal oxide selected from the group consisting of vanadium oxide, copper oxide, nickel oxide and iron oxide, the catalyst being supported on a porous carrier. The process of the invention enables one to substantially completely reduce $NO_x$ to harmless $N_2$ in an efficient, environmentally friendly and cost-effective manner.

14 Claims, 1 Drawing Sheet

U.S. PATENT DOCUMENTS

| | | |
|---|---|---|
| 0445408 | 12/1990 | European Pat. Off. . |
| 2801782 | 8/1978 | Germany . |
| 2233124 | 9/1990 | Japan . |
| 4-334527 | 11/1992 | Japan . |
| 6-226052 | 8/1994 | Japan . |
| 6-319954 | 11/1994 | Japan . |
| 7-116471 | 5/1995 | Japan . |
| 7-116472 | 5/1995 | Japan . |
| 7-116473 | 5/1995 | Japan . |

SELECTIVE CATALYTIC REDUCTION OF NITROGEN OXIDES

BACKGROUND OF THE INVENTION

The present invention pertains to improvements in the emission control of environmentally harmful and regulated nitrogen oxides ($NO_x$) which are produced in a variety of processes such as the combustion of fossil fuels. More particularly, the invention relates to an improved process for the selective catalytic reduction of nitrogen oxides to nitrogen.

Atmospheric pollution caused by $NO_x$ emissions has become a matter of growing global concern in recent years. Nitrogen oxides contribute to acid rain and photochemical smog, and can cause respiratory problems. It is now recognized that the ground-level ozone is formed in the atmosphere through a photochemical reaction not only from volatile organic compounds but also from oxides of nitrogen.

The main sources of $NO_x$ emissions in industrialized countries are transportation, electric utilities, and industrial boilers. Much of the $NO_x$ is a product of combustion of fossil fuels such as coal, oil or gas.

Stringent regulations on $NO_x$ emission control are currently being implemented in industrialized countries and the limit of $NO_x$ discharge into the environment is successively being revised to place increasingly effective control requirements with an ultimate goal of zero $NO_x$ emission. In California, for instance, emission limits of 9 ppm or less have been imposed for industrial boilers above approximately 5860 kw (20 million btu/hr.)

Due to these stringent regulations on $NO_x$ emissions, the development of an effective $NO_x$ control technology has gained importance in recent years. To date, the most effective technology for controlling $NO_x$ emissions is the selective catalytic reduction (SCR) of $NO_x$. In this method, $NO_x$ ($NO+NO_2$) are reduced by $NH_3$ to $N_2$ and $H_2O$, usually at 250°–400° C. over a catalyst. The following reactions occur:

$$4NO+4NH_3+O_2 \rightarrow 4N_2+6H_2O$$

$$6NO_2+8NH_3 \rightarrow 7N_2+12H_2O$$

$$2NO_2+4NH_3+O_2 \rightarrow 3N_2+6H_2O$$

Since usually over 80 vol. % of the $NO_x$ is in the form of NO, the first reaction is the most important. Selective catalytic reduction by $NH_3$ requires an ammonia injection system and an ammonia storage system. A practical disadvantage of this process is that it requires a complex and expensive set-up for safely handling $NH_3$ which is a hazardous chemical.

Known catalytic systems which are able to catalyze effectively the above $NO_x$ reduction reactions using $NH_3$ are supported noble metals, supported base metal oxides and zeolites. Noble metal catalysts such as those based on Pt, Rh, Ru or Pd supported on $Al_2O_3$ or other carriers, which are used widely in catalytic converters for automobile-exhaust $NO_x$ reduction, are usually not considered for flue gas treatment due to several drawbacks. These drawbacks include high cost, susceptibility to $SO_2$ poisoning and substantial reduction of the catalytic activity at high temperatures or in the presence of excess oxygen due to accumulation of adsorbed oxygen.

Catalysts based on vanadia or tungsten-vanadia as active components supported on porous anatase-type titania are currently known to be most promising for the selective catalytic reduction of NO by $NH_3$ mainly because of their high activity at low temperatures and good resistance to $SO_2$ poisoning. These catalysts are presently used in many commercial installations. However, even with these catalysts, a number of problems are encountered. During the SCR process, $NH_3$ can also undergo oxidation to undesirable $NO_x$ according to the following reactions:

$$4NH_3+3O_2 \rightarrow 2N_2+6H_2O$$

$$4NH_3+5O_2 \rightarrow 4NO+6H_2O$$

$$2NH_3+2O_2 \rightarrow N_2O+3H_2O$$

When the $NH_3$ oxidation proceeds in parallel with SCR, it results in a greater $NH_3$ consumption and a lower $NO_x$ removal efficiency. Ammonia oxidation reactions are dominant at higher temperatures (>425° C.). The usual operating temperature required for SCR reaction ranges from about 300° to about 425° C. for peak $NO_x$ conversion efficiency. This temperature constraint limits the flexibility of the SCR reactor location in the integrated flue gas clean-up unit and incurs a heat exchanger cost for applications where the flue gas temperature exceeds this temperature limit. From a practical view point, the selectively and activity of the catalysts should be retained over a broad temperature range.

Another serious disadvantage with the selective catalytic reduction of $NO_x$ by $NH_3$ is the risk of unacceptably high levels of ammonia emission known as "ammonia slip". The role of ammonia in polluting the atmosphere is well known. Ammonia slip can, in principle, be suppressed by lowering the reactor inlet $NH_3/NO_x$ ratio. This however, adversely affects the $NO_x$ removal efficiency.

Although vanadia and tungsten-vanadia based catalysts exhibit resistance to $SO_2$ poisoning, they catalyze oxidation of $SO_2$ to $SO_3$. This latter compound ($SO_3$) reacts with $NH_3$ and $H_2O$ to form compounds such as $NH_4HSO_4$ and $(NH_4)_2S_2O_7$. These compounds cause corrosion, plugging of the catalytic reactor and other parts of the system, and more undesirably, plugging of the pores of the catalysts. Pore plugging of the catalyst eventually results in a deactivation of the catalyst at a fixed $NH_3/NO$ ratio and an increase of ammonia slip. The loss in activity can be restored by increasing the inlet $NH_3/NO$ ratio. However, increasing the $NH_3/NO$ ratio has the effect that ammonia slip also increases. Plugging of the catalyst pores and the reactor can also occur due to possible formation of $NH_4NO_3$ by homogeneous reaction between $NH_3$, $NO_2$ and $H_2O$.

SUMMARY OF THE INVENTION

It is therefore an object of the present invention to overcome the above drawbacks and to provide a process for the direct and substantially complete reduction of nitrogen oxides.

It is another object of the invention to provide an improved process for the selective catalytic reduction of nitrogen oxides, which avoids the use of a hazardous or toxic gas.

In accordance with the present invention, there is thus provided a process for the selective catalytic reduction of nitrogen oxides to nitrogen, which comprises reacting nitric oxide, nitrogen dioxide or a mixture thereof with a reducing agent consisting of an aliphatic carboxylic acid having 1 to 5 carbon atoms at a temperature ranging from about 250° to about 600° C., in the presence of a catalyst comprising a metal oxide selected from the group consisting of vanadium oxide, copper oxide, nickel oxide and iron oxide, the catalyst being supported on a porous carrier.

Applicant has found quite unexpectedly that by using as a reducing agent an aliphatic carboxylic acid containing 1 to 5 carbon atoms the direct and substantially complete reduction of nitrogen oxides can be achieved, provided that the reduction be carried out within the above temperature range and in the presence of the above defined catalyst.

The carboxylic acids used in accordance with the present invention, in addition to being environmentally safe, possess a very reactive or labile hydrogen atom in their structure. An oxidizing agent such as NO and $NO_2$ can easily abstract this labile hydrogen, forming HNO and/or $HNO_2$ radicals. These reactive species once formed undergo a series of reactions to produce $N_2$ and $H_2O$. The corresponding organic radicals generated from the primary decomposition of carboxylic acids readily undergo further reactions to produce $CO_2$ and $H_2O$. The catalytic reduction of $NO_x$ with carboxylic acids ensures complete destruction of $NO_x$ so that the final products comprise $N_2$, $CO_2$ and $H_2O$ only. Under these conditions, complete oxidation of intermediate products occurs. The overall reactions are as follows:

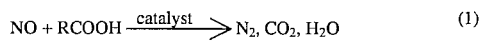  (1)

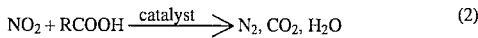  (2)

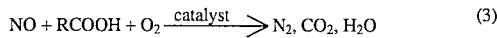  (3)

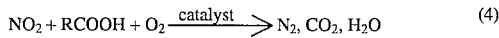  (4)

where R represents a hydrogen atom or an alkyl group having 1 to 4 carbon atoms.

The mechanism for the selective catalytic reduction of $NO_x$ with RCOOH is believed to be as follows:

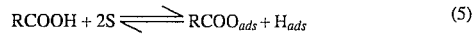  (5)

  (6)

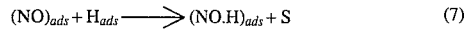  (7)

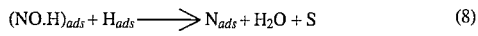  (8)

  (9)

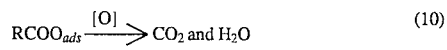  (10)

where S denotes a vacant surface site and subscript 'ads' refers to an adsorbed species on the catalyst.

In addition to reactions (1)–(4), undesirable side reaction (11) could also occur, that is, RCOOH could to some extent be oxidized by $O_2$ (present in combustion exhaust of fuel burners) according to the following overall reaction:

  (11)

The above defined catalysts used in the RCOOH-based selective catalytic reduction according to the invention are effective in promoting reactions (1) to (4) and suppressing the side reaction (11).

The loading of metal oxide on the support may vary in the range of about 5 to about 50 mole %, and more preferably in the range of about 8 to about 20 mole %. The total (BET) surface area of the catalyst may vary in the range of about 50 to about 500 $m^2/g$, and more preferably in the range of about 100 to about 300 $m^2/g$.

The reaction is preferably carried out at a temperature of about 450° to about 500° C. Preferably, nitrogen or water vapor is admixed with the reducing agent.

The process of the invention enables one to substantially completely reduce $NO_x$ to harmless $N_2$ in an efficient, environmentally friendly and cost-effective manner.

BRIEF DESCRIPTION OF THE DRAWINGS

Further features and advantages of the invention will become more readily apparent from the following description of a preferred embodiment as illustrated by way of example in the accompanying drawing, in which.

DESCRIPTION OF PREFERRED EMBODIMENTS

Figure 1:
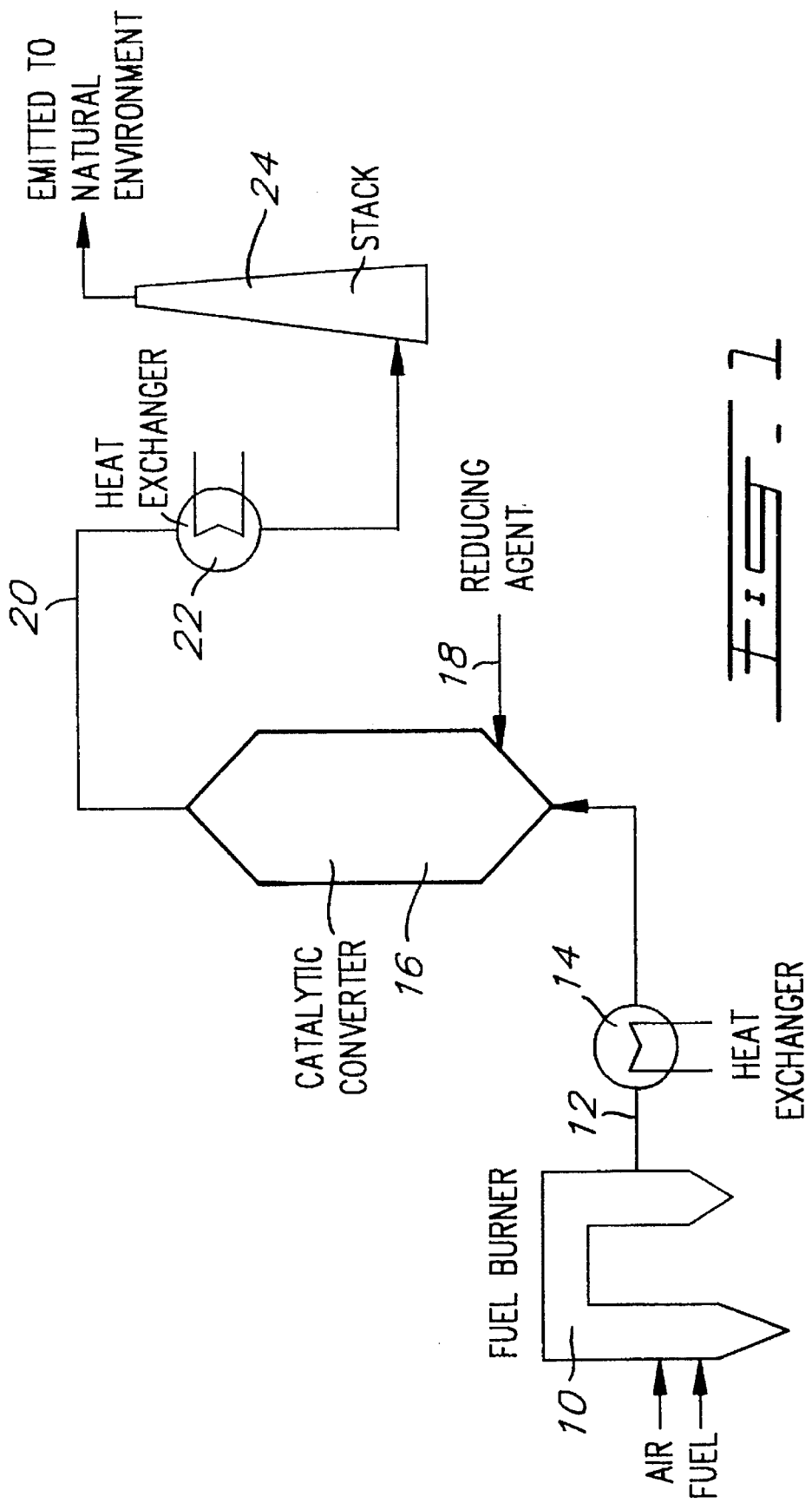
FIG. 1 is a flow diagram of a process for the selective reduction of nitrogen oxides according to the invention.

In the process which is schematically illustrated in FIG. 1, the $NO_x$ containing gaseous mixture produced in the fuel burner 10 by the combustion of fuel and discharged via line 12 is passed through a heat exchanger 14 for recovering most of the heat generated by the fuel combustion and lowering the temperature of the gas stream to about 250°–600° C., and then sent to a catalytic converter 16 containing a fixed bed of a vanadium oxide, copper oxide, nickel oxide or iron oxide based catalyst. As the $NO_x$ containing gas stream enters into the converter 16, it is mixed with a reducing gas stream which is fed via feed line 18 and contains, as a reducing agent, an aliphatic carboxylic acid having 1 to 5 carbon atoms in admixture with nitrogen and water vapor. The resulting gaseous mixture is passed through the catalyst bed maintained at a temperature of 250°–600° C. and reacted with the reducing agent. The effluent stream which is discharged via line 20 and is free of $NO_x$ contaminants is passed through a heat exchanger 22 for recovering useful heat and then through a stack 24 before being discharged at a regulatory height to the natural environment.

The following non-limiting examples further illustrate the invention.

EXAMPLE 1

A $V_2O_5/\gamma$-$Al_2O_3$ catalyst containing 10 mole % $V_2O_5$ was prepared by impregnating $\gamma$-$Al_2O_3$ (10 g) with a solution of oxalic acid (4.0 g) and ammonium metavanadate (2.34 g) in distilled water (50 ml). The impregnation was carried out by adding the $V_2O_5/\gamma$-$Al_2O_3$ to the solution followed by mixing and water evaporation. The impregnated material was further dried in an oven at 120° C. for 8 hours and calcined in a muffle furnace at 500° C. for 2 hours. The BET surface area of the catalyst was 175 $m^2/g$.

A quartz microreactor was packed with 0.3 g of the above catalyst and placed in a continuous flow reactor. A gaseous mixture containing nitric oxide and acetic acid was passed through the downflow reactor at a flow rate of 70 ml/min. The molar composition of the feed gaseous mixture was as follows: 0.106% NO, 0.28% acetic acid, 2.15% water vapor and balance nitrogen. The reactor temperature was maintained at 435° C.

The composition of the reactor effluent was analyzed by a chemilnminescence $NO_x$ analyzer, and also by gas chromatography. The concentration of nitric oxide at various times on-stream is reported in Table 1.

TABLE 1

| Time on Stream, min. | $NO_x$ Conc. ppm | $N_2O$ Conc. ppm | $NO_x$ Conversion mole % |
|---|---|---|---|
| 0 | 1062 ± 11 | N.D. | 0 |
| 15 | 26 ± 0.3 | N.D. | 97.6 |
| 35 | 10 ± 0.1 | N.D. | 99.1 |
| 60 | 5.5 ± 0.06 | N.D. | 99.5 |
| 80 | 3.9 ± 0.04 | N.D. | 99.6 |

N.D. = Not Detected
$NO_x$ Detection Limit = 50 ppb

As it is apparent from Table 1, under a steady state, the concentration of nitric oxide was reduced from 1060 ppm to 3.9 ppm, indicating a conversion of 99.6%. The formation of other oxides of nitrogen such as $NO_2$ or $N_2O$ was not detected.

EXAMPLE 2

The same feed mixture as in Example 1 was passed through a microreactor packed with 0.3 g of a $V_2O_5/\gamma$-$Al_2O_3$ catalyst containing 10 mole % $V_2O_5$, at 70 ml/min. flow rate. The reactor temperature was maintained at 445° C. The composition of the reactor effluent was analyzed in the same manner as in Example 1. The concentration of $NO_x$ in the reactor effluent is reported in Table 2.

TABLE 2

| Time on Stream, min. | $NO_x$ Conc. ppm | $N_2O$ Conc. ppm | $NO_x$ Conversion mole % |
|---|---|---|---|
| 180 | 1.5 | N.D. | 99.86 |

N.D. = Not Detected

As it is apparent from Table 2, the concentration of nitric oxide in the reactor effluent was 1.5 ppm, indicating a NO conversion of 99.86%. No other oxides of nitrogen such as $NO_2$ or $N_2O$ were detected in the reactor effluent.

EXAMPLE 3

A gaseous mixture containing 0.62 mole % nitric oxide, 0.65 mole % acetic acid, 3.09 mole % water vapor and 95.64 mole % helium was passed through a microreactor packed with 0.3 g of a $V_2O_5/\gamma$-$Al_2O_3$ catalyst containing 10 mole % $V_2O_5$, at a flow rate of 100 ml/min. The reactor effluent was analyzed under steady state conditions. The concentration of nitric oxide in the reactor effluent at various reaction temperatures is reported in Table 3.

TABLE 3

| Reactor Temp. °C. | Conc. of NO in Reactor Effluent, ppm | Conc. of $N_2$ in Reactor Effluent, ppm | Conversion NO mole % |
|---|---|---|---|
| 375 | 3200 | 1375 | 48.4 |
| 450 | 738 | 2725 | 88.1 |
| 480 | 198 | 2993 | 96.8 |
| 490 | 73 | 3058 | 98.8 |
| 520 | 0 | 3096 | 100.0 |

As it is apparent from Table 3, in the temperature range of 375°–520° C., the NO conversion varies in the range 48% to 100%. A corresponding generation of $N_2$ was observed, as shown by the $N_2$ concentration in the reactor effluent. The conversion of NO in the absence of acetic acid was zero in the temperature range 375°–520° C.

EXAMPLE 4

A CuO-NiO/$\gamma$-$Al_2O_3$ catalyst containing 5 wt. % Cu and 5 wt. % Ni, calculated as metallic elements, was prepared by impregnating $\gamma$-$Al_2O_3$ (10 g) with a solution of cupric nitrate [$Cu(NO_3)_2 \cdot 3H_2O$] (1.901 g) and nickel nitrate [$Ni(NO_3)_2 \cdot 6H_2O$] (2.477 g) in distilled water (50 ml). The impregnated material was dried in an oven at 120° C. for 8 hours and calcined in a muffle furnace at 500° C. for 2 hours. The BET surface area of the catalyst was 175 $m^2$/g. A gaseous mixture containing 0.058 mol % (or 580 ppm) nitrogen oxides, 0.1 mol % acetic acid, 2.5 mol % oxygen, 16.1 mol % carbon dioxide in nitrogen was passed through a quartz microreactor packed with 1.0 g of CuO-NiO/$\gamma$-$Al_2O_3$ catalyst at a flow rate of 100 ml/min. The concentration of nitrogen oxides in the reactor effluent under steady state was monitored at various reaction temperatures, and is reported in Table 4.

TABLE 4

| Reactor Temp. °C. | Conc. of $NO_x$ in Reactor Effluent, ppm | Conversion of $NO_x$ mole % |
|---|---|---|
| 230 | 55 | 90.5 |
| 270 | 6 | 99.0 |
| 350 | 190 | 67.2 |
| 400 | 312 | 46.2 |
| 460 | 391 | 32.6 |

As it is apparent from Table 4, with oxygen present in the gaseous feed mixture, the conversion of $NO_x$ passes through a maximum in the temperature range of 230°–460° C. For example, at an intermediate temperature of 270° C., the concentration of $NO_x$ in the reactor effluent was as low as 6 ppm, representing a $NO_x$ conversion of 99.0 mole %.

COMPARATIVE EXAMPLE

A catalyst consisting of a ZSM-5 type zeolite in protonated form having a $SiO_2/Al_2O_3$ ratio of 36 was prepared by crystallizing silica rich gels containing tetrapropyl ammonium bromide as template, following the procedure outlined in U.S. Pat. No. 3,702,886. The BET surface area of this catalyst was 376 $m^2$/g. A gaseous mixture containing 0.15 mole % nitric oxide, 0.31 mole % acetic acid, 0.95 mole % water vapor and 98.59 mole % nitrogen was passed through a microreactor packed with 0.15 g of the zeolite catalyst at a flow rate of 45 ml/min. The reactor temperature was maintained at 500° C. The reactor effluent was analyzed under steady state conditions. The concentration of nitric oxide in the reactor effluent was 0.14%, indicating a NO conversion of only 4.7%. This is much lower compared to 99% conversion obtained using $V_2O_5/\gamma$-$Al_2O_3$ and CuO-NiO/$\gamma$-$Al_2O_3$ catalysts under similar conditions.

We claim:

1. A process for the selective catalytic reduction of nitrogen oxides to nitrogen, which comprises reacting nitric oxide, nitrogen dioxide or a mixture thereof with a reducing agent consisting of an aliphatic carboxylic acid having 1 to 5 carbon atoms at a temperature ranging from about 250° to about 600° C., in the presence of molecular oxygen and a catalyst consisting of a metal oxide selected from the group consisting of vanadium oxide, copper oxide, nickel oxide, iron oxide, and a mixture thereof, said catalyst being supported on a porous carrier consisting essentially of alumina.

2. A process as claimed in claim 1, wherein said carboxylic acid is selected from the group consisting of formic acid, acetic acid, propionic acid and butyric acid.

3. A process as claimed in claim 2, wherein said carboxylic acid is acetic acid.

4. A process as claimed in claim 3, wherein the metal oxide comprises vanadium oxide.

5. A process as claimed in claim 1, wherein said catalyst comprises about 5 to about 50 mole % of said metal oxide.

6. A process as claimed in claim 5, wherein said catalyst comprises about 8 to about 20 mole % of said metal oxide.

7. A process as claimed in claim 1, wherein said catalyst has a total surface area ranging from about 50 to about 500 m$^2$/g.

8. A process as claimed in claim 7, wherein the total surface area of said catalyst ranges from about 100 to about 300 m$^2$/g.

9. A process as claimed in claim 1, wherein said metal oxide comprises vanadium oxide.

10. A process as claimed in claim 9, wherein said catalyst comprises about 10 mole % of vanadium oxide.

11. A process as claimed in claim 1, wherein said metal oxide comprises a mixture of copper oxide and nickel oxide.

12. A process as claimed in claim 11, wherein said catalyst comprises about 5 wt. % Cu and about 5 wt. % Ni, calculated as metallic elements.

13. A process as claimed in claim 1, wherein nitrogen or water vapor is admixed with said reducing agent.

14. A process as claimed in claim 1, wherein said reaction is carried out at a temperature ranging from about 450° to about 550° C.

* * * * *